United States Patent
Divsalar et al.

(10) Patent No.: US 9,602,316 B2
(45) Date of Patent: *Mar. 21, 2017

(54) MULTIPLE SYMBOL NONCOHERENT SOFT OUTPUT DETECTOR

(75) Inventors: Dariush Divsalar, Pacific Palisades, CA (US); Ramin Sadr, Los Angeles, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,616

(22) Filed: Mar. 7, 2012

(65) Prior Publication Data

US 2012/0275546 A1    Nov. 1, 2012

Related U.S. Application Data

(60) Provisional application No. 61/449,869, filed on Mar. 7, 2011.

(51) Int. Cl.
*H04L 27/06* (2006.01)
*H04L 25/03* (2006.01)

(52) U.S. Cl.
CPC .............. *H04L 25/03171* (2013.01)

(58) Field of Classification Search
CPC .. H04L 1/005; H04L 25/067; H03M 13/2957; B60R 21/0134
USPC ........ 375/341, 340, 332, 324, 322; 370/340; 340/10.4; 342/387
See application file for complete search history.

(56) References Cited

U.S. PATENT DOCUMENTS

| 5,040,191 A | 8/1991 | Forney et al. |
| 5,369,404 A | 11/1994 | Galton |
| 5,684,832 A | 11/1997 | Adachi et al. |
| 5,955,966 A | 9/1999 | Jeffryes et al. |
| 6,233,290 B1 | 5/2001 | Raphaeli |

(Continued)

FOREIGN PATENT DOCUMENTS

| EP | 1313249 A2 | 5/2003 |
| EP | 1362320 A2 | 11/2003 |

(Continued)

OTHER PUBLICATIONS

International Search Report and Written Opinion for International Application No. PCT/US2006/060339, filed Oct. 27, 2006, search completed Jul. 7, 2008, mailed Jul. 21, 2008, 5 pages.

(Continued)

*Primary Examiner* — Sam K Ahn
*Assistant Examiner* — Fabricio R Murillo Garcia
(74) *Attorney, Agent, or Firm* — KPPB LLP

(57) ABSTRACT

Multiple symbol noncoherent soft output detectors in accordance with embodiments of the invention are disclosed. In a number of embodiments, the multiple symbol noncoherent soft output detector uses soft metrics based on the Log Likelihood Ratio (LLR) of each symbol to provide information concerning the reliability of each detected symbol. One embodiment of the invention includes a receiver configured to receive and sample a phase modulated input signal, and a multiple symbol noncoherent soft output detector configured to receive the sampled input signal and to generate a soft metric indicative of the reliability of a detected symbol based upon observations over multiple symbols.

33 Claims, 8 Drawing Sheets

(56) References Cited

U.S. PATENT DOCUMENTS

| | | |
|---|---|---|
| 6,750,757 B1 | 6/2004 | Gabig, Jr. et al. |
| 6,836,472 B2 | 12/2004 | O'toole et al. |
| 7,066,441 B2 | 6/2006 | Warburton-Pitt |
| 7,076,000 B2 | 7/2006 | Rodriguez |
| 7,418,065 B2 | 8/2008 | Qiu et al. |
| 7,599,441 B2 | 10/2009 | Ma et al. |
| 7,633,377 B2 | 12/2009 | Sadr |
| 8,400,271 B2 | 3/2013 | Sadr |
| 8,552,835 B2 | 10/2013 | Sadr |
| 8,941,472 B2 | 1/2015 | Sadr |
| 8,981,908 B2 | 3/2015 | Sadr |
| 9,008,239 B2 | 4/2015 | Sadr et al. |
| 9,312,987 B2 | 4/2016 | Sadr et al. |
| 2001/0001616 A1 | 5/2001 | Rakib et al. |
| 2001/0017898 A1 | 8/2001 | Raheli et al. |
| 2001/0022813 A1 | 9/2001 | Tan et al. |
| 2002/0057729 A1 | 5/2002 | Farbod et al. |
| 2002/0113736 A1 | 8/2002 | Toutain et al. |
| 2002/0122472 A1 | 9/2002 | Lay |
| 2002/0131515 A1* | 9/2002 | Rodriguez .................... 375/262 |
| 2002/0159540 A1 | 10/2002 | Chiodini |
| 2003/0138055 A1* | 7/2003 | Saito et al. .................... 375/262 |
| 2004/0001460 A1 | 1/2004 | Bevan et al. |
| 2004/0042539 A1 | 3/2004 | Vishakhadatta et al. |
| 2004/0067764 A1 | 4/2004 | Pratt et al. |
| 2005/0271165 A1* | 12/2005 | Geraniotis et al. ........... 375/340 |
| 2005/0280508 A1 | 12/2005 | Mravca et al. |
| 2006/0022800 A1 | 2/2006 | Krishna et al. |
| 2006/0094391 A1 | 5/2006 | Darabi |
| 2006/0103576 A1 | 5/2006 | Mahmoud et al. |
| 2006/0170565 A1 | 8/2006 | Husak et al. |
| 2006/0291592 A1* | 12/2006 | Perrins .................... H04L 27/18 375/340 |
| 2007/0032241 A1 | 2/2007 | Busch et al. |
| 2007/0127595 A1* | 6/2007 | Simon .................... H04L 1/005 375/308 |
| 2008/0186231 A1* | 8/2008 | Aljadeff et al. .............. 342/387 |
| 2008/0197982 A1* | 8/2008 | Sadr .................. H03M 13/2957 340/10.4 |
| 2009/0135800 A1* | 5/2009 | McPherson .................... 370/342 |
| 2009/0207947 A1* | 8/2009 | Strodtbeck ................ H04L 1/06 375/340 |
| 2010/0310019 A1 | 12/2010 | Sadr |
| 2013/0147608 A1 | 6/2013 | Sadr |
| 2013/0202062 A1 | 8/2013 | Sadr et al. |
| 2014/0218172 A1 | 8/2014 | Sadr |
| 2015/0169909 A1 | 6/2015 | Sadr |
| 2015/0215073 A1 | 7/2015 | Sadr et al. |
| 2015/0371067 A1 | 12/2015 | Sadr |
| 2016/0191206 A1 | 6/2016 | Sadr et al. |

FOREIGN PATENT DOCUMENTS

| | | |
|---|---|---|
| JP | 2005136570 A | 5/2005 |
| WO | 9429990 | 12/1994 |
| WO | 02065380 A2 | 8/2002 |
| WO | 2005101652 A1 | 10/2005 |
| WO | 2014151943 A1 | 9/2014 |

OTHER PUBLICATIONS

Supplementary European Search Report for Application No. EP 06850079, International Filing Date Oct. 27, 2006, Search Completed Dec. 12, 2013, 7 pgs.

International Search Report and Written Opinion for International Application PCT/US2014/026707, International Filing Date Mar. 13, 2014, Report Completed Jun. 28, 2014, Mailed Aug. 1, 2014, 6 pages, Aug. 1, 2014.

Chevillat et al., "Decoding of Trellis-Encoded Signals in the Presence of Intersymbol Interference and Noise", IEEE Transactions on Communications, 1989, vol. 37, No. 7, pp. 669-676.

Divsalar et al., "Multiple-Symbol Differential Detection of MPSK", IEEE Transactions on Communications, Mar. 1990, vol. 38, No. 3, pp. 300-308.

EPCGLOBAL, "EPC standard, Published Jan. 26, 2005, 94 pgs.".

Forney, Jr., "Maximum-Likelihood Sequence Estimation of Digital Sequences in the Presence of Intersymbol Interference", IEEE Transactions on Information Theory, May 1972, vol. IT-18, No. 3, pp. 363-378.

Kerpez, "Viterbi Receivers in the Presence of Severe Intersymbol Interference", IEEE Xplore, downloaded on Jan. 21, 2009, pp. 2009-2013.

Makrakis et al., "Optimal Noncoherent Detection of PSK Signals", IEEE Electronics Letters, Mar. 15, 1990, vol. 26, No. 6, pp. 398-400.

Sadr et al., "Generalized Minimum Shift-Keying Modulation Techniques", IEEE Transactions on Communications, Jan. 1988, vol. 36, No. 1, pp. 32-40.

Extended European Search Report for European Application EP15164416.8, Report Completed Aug. 21, 2015, Mailed Aug. 31, 2015, 5 Pgs.

International Preliminary Report on Patentability for International Application PCT/US14/26707, Issued Sep. 15, 2015, Mailed Sep. 24, 2015, 5 Pgs.

Extended European Search Report for European Application No. 14767719.9, Search completed Sep. 12, 2016, Mailed Sep. 19, 2016, 7 Pgs.

\* cited by examiner

MULTIPLE SYMBOL NONCOHERENT SOFT OUTPUT DETECTOR

CROSS-REFERENCE TO RELATED APPLICATION

The present invention claims priority under 35 U.S.C. §119(e) to U.S. Provisional Patent Application Ser. No. 61/449,869 entitled "LLR for Symbol Stream Combining of FM0 with Preamble and Pilot", to Dariush Divsalar filed Mar. 7, 2011, the disclosure of which is incorporated by reference herein in its entirety.

FIELD OF THE INVENTION

The present invention relates to communication systems and more specifically to multiple symbol noncoherent soft output detection.

BACKGROUND

In many applications, noncoherent or differential detection is an attractive alternative to coherent detection due to the simplicity of implementation and/or where the transmission environment is sufficiently degraded, e.g., a multipath fading channel, that acquiring and tracking a coherent demodulation reference signal is difficult if not impossible. A noncoherent detector is a detector that does not directly estimate the phase of the received signal. Although differential detection removes the need for carrier acquisition and tracking in the receiver, it suffers from a performance penalty (additional required SNR at a given bit error rate) when compared to ideal (perfect carrier phase reference) coherent detection. The amount of this performance penalty increases with the number of phases M and is significant for M≥4. Dariush Divsalar and Marvin K. Simon, in their paper entitled "Multiple-Symbol Differential Detection of MPSK," IEEE Transactions on Communications, March 1990 (the disclosure of which is incorporated by reference in its entirety), presented a differential detection technique involving making a joint decision on several symbols simultaneously as opposed to symbol-by-symbol detection. The multiple symbol differential detection technique is a form of maximum-likelihood sequence estimation and assumes that carrier phase is constant during the extended observation interval, which is typically a reasonable assumption for observations of the order of three or four symbol observations. The multiple symbol differential detector described by Dr. Divsalar and Dr. Simon performs hard decisions. A hard decision is a decision between a fixed set of possible values (e.g. 0 or 1). In a soft output detector, each bit in the output also takes on a value indicating reliability.

SUMMARY OF THE INVENTION

Systems and methods in accordance with embodiments of the invention perform multiple symbol noncoherent soft output detection. In a number of embodiments, the multiple symbol noncoherent soft output detector uses soft metrics based on the Log Likelihood Ratio (LLR) of each symbol to provide information concerning the reliability of each detected symbol. In many embodiments, a pilot and/or preamble sequence in a received packet is used by a multiple symbol noncoherent soft output detector to provide additional observations of the carrier phase. In this way, the multiple symbol noncoherent soft output detector can utilize the pilot and/or preamble sequence to improve the reliability of the detection of the unknown data symbols within a received packet. In several embodiments, soft metrics from a set of multiple symbol noncoherent soft output detectors are utilized to improve the reliability of detected data symbols. In a number of embodiments, soft metrics generated by a set of multiple symbol noncoherent soft output detectors are utilized to detect a received data sequence using the output from the multiple symbol noncoherent soft output detector that is most reliable. In addition, the soft metrics can be utilized for other purposes including (but not limited to) performing collision detection.

One embodiment of the invention includes a receiver configured to receive and sample a phase modulated input signal, and a multiple symbol noncoherent soft output detector configured to receive the sampled input signal and to generate a soft metric indicative of the reliability of a detected symbol based upon observations over multiple symbols.

In a further embodiment, the soft metric is based on the Log Likelihood Ratio of the detected symbol based upon observations over multiple symbols.

In another embodiment, the observations include at least one known symbol.

In a still further embodiment, the observations include observations over a three symbol sequence.

In still another embodiment, the phase modulated input signal comprises data that is phase modulated on a carrier; and the multiple symbol noncoherent soft output detector assumes that carrier phase of the input signal is constant over the time duration of the observations.

In a yet further embodiment, the phase modulated input signal is a binary phase modulated signal.

In yet another embodiment, the phase modulated input signal is a Multiple-Phase-Shift Keying modulated signal.

In a further embodiment again, the multiple symbol noncoherent soft output detector comprises a plurality of matched filters having different numbers of samples configured to integrate the samples during each half-symbol period, and the multiple symbol noncoherent soft output detector is configured to use the outputs of each of the plurality of matched filters to determine the most likely symbol duration.

Another embodiment again includes a plurality of receivers configured to receive and sample an input signal, where the input signal comprises data that is phase modulated onto a carrier, a plurality of multiple symbol noncoherent soft output detectors configured to receive a sampled input signal from one of the plurality of receivers and to generate a soft metric indicative of the reliability of a detected symbol based upon observations over multiple symbols, and a combiner configured to receive the soft metrics from the plurality of multiple symbol noncoherent soft output detectors and to detect data based upon the soft metrics.

In a further additional embodiment, the combiner is configured to detect data by combining the soft metrics.

In another additional embodiment, the combiner is configured to select at least one of the soft metrics from the plurality of multiple symbol noncoherent soft output detectors based upon a threshold level of reliability.

In a still yet further embodiment, the soft metrics generated by the plurality of multiple symbol noncoherent soft output detectors are based on the Log Likelihood Ratio of the detected symbol based upon observations over multiple symbols.

In still yet another embodiment, the observations include at least one known symbol.

In a still further embodiment again, the observations include observations over a three symbol sequence.

In still another embodiment again, each of the plurality of multiple symbol noncoherent soft output detectors assumes that carrier phase of the input signal is constant over the time duration of the observations.

In a still further additional embodiment, the phase modulated input signal is a binary phase modulated signal.

In still another additional embodiment, the phase modulated input signal is a Multiple-Phase-Shift Keying modulated signal.

In a yet further embodiment again, each of the plurality of multiple symbol noncoherent soft output detectors comprises a plurality of matched filters having different numbers of samples configured to integrate the samples during each half-symbol period, and each of the plurality of multiple symbol noncoherent soft output detectors is configured to use the outputs of each of the plurality of matched filters to determine the most likely symbol duration.

Yet another embodiment again includes an antenna configured to receive a phase modulated signal comprising symbols transmitted by an RFID tag, a receiver configured to sample the phase modulated signal, and a multiple symbol noncoherent soft output detector configured to receive the sampled input signal and to generate soft metrics indicative of the reliability of a detected symbol based upon observations over multiple symbols.

In a yet further additional embodiment, the soft metric is based on the Log Likelihood Ratio of the detected symbol based upon observations over multiple symbols.

In yet another additional embodiment, the phase modulated input signal is an FM0 modulated signal.

In a further additional embodiment again, the FM0 modulated input signal comprises a known preamble sequence and an unknown data sequence.

In another additional embodiment again, the observations include observations over at least one symbol in the preamble sequence and at least one symbol in the unknown data sequence.

In a still yet further embodiment again, the observations include observations over the entire preamble and at least three symbols in the unknown data sequence.

In still yet another embodiment again, the FM0 modulated input signal further comprises a known pilot sequence, and the observations include observations over the entire pilot and preamble and at least three symbols in the unknown data sequence.

In a still yet further additional embodiment, the multiple symbol noncoherent soft output detector assumes that carrier phase of the input signal is constant over the time duration of the observations.

In still yet another additional embodiment, the multiple symbol noncoherent soft output detector comprises a plurality of matched filters having different numbers of samples configured to integrate the samples during each half-symbol period, and the multiple symbol noncoherent soft output detector is configured to use the outputs of each of the plurality of matched filters to determine the most likely symbol duration.

In a still further additional embodiment again, the multiple symbol noncoherent soft output detector is configured to detect RFID tag transmission collisions based upon the LLRs of the detected symbols.

In still another additional embodiment again, the phase modulated signal comprising symbols transmitted by an RFID tag is a phase modulated signal comprising symbols backscattered by an RFID tag.

A yet further additional embodiment again includes a plurality of antennas configured to receive an input signal transmitted by an RFID tag, where the input signal comprises data that is phase modulated onto a carrier, a plurality of receivers configured to sample the phase modulated signal from least one of the plurality of antennas, a plurality of multiple symbol noncoherent soft output detectors configured to receive the sampled input signal from one of the plurality of receivers and to generate soft metrics indicative of the reliability of a detected symbol based upon observations over multiple symbols, and a combiner configured to receive the soft metrics from the plurality of multiple symbol noncoherent soft output detectors and to detect data based upon the soft metrics.

In another further embodiment, the combiner is configured to detect data by combining the soft metrics.

In still another further embodiment, the combiner is configured to select at least one of the soft metrics from the plurality of multiple symbol noncoherent soft output detectors based upon a threshold level of reliability.

In yet another further embodiment, the soft metrics generated by the plurality of multiple symbol noncoherent soft output detectors are based on the Log Likelihood Ratio of the detected symbol based upon observations over multiple symbols.

In another further embodiment again, the phase modulated input signal is an FM0 modulated input signal.

In another further additional embodiment, the FM0 modulated input signal comprises a known preamble sequence and an unknown data sequence.

In still yet another further embodiment, the observations include observations over at least one symbol in the preamble sequence and at least one symbol in the unknown data sequence.

In still another further embodiment again, the observations include observations over the entire preamble and at least three symbols in the unknown data sequence.

In still another further additional embodiment, the FM0 modulated input signal further comprises a known pilot sequence, and the observations include observations over the entire pilot and preamble and at least three symbols in the unknown data sequence.

In yet another further embodiment again, the phase modulated signal comprising symbols transmitted by an RFID tag is a phase modulated signal comprising symbols backscattered by an RFID tag.

DETAILED DESCRIPTION

Turning now to the drawings, multiple symbol noncoherent soft output detectors that generate soft metrics indicating the reliability of detected data in accordance with embodiments of the invention are illustrated. In many embodiments, the multiple symbol noncoherent soft output detector determines soft metrics based on the log likelihood ratio (LLR) for each detected symbol using observations with respect to multiple symbols. For received sequences including pilot, preamble, and data symbols, where the pilot and preamble are known to the detector, the observations utilized to determine the soft metrics for each symbol can include observations of some or all of the symbols in the pilot and/or preamble and a short sequence of multiple data symbols. In several embodiments, a short sequence of two or three unknown data symbols is utilized when generating the soft metric for an unknown data symbol. In other embodiments, a sequence of any number of symbols can be utilized to determine the soft metrics.

The ability of multiple symbol noncoherent soft output detectors in accordance with embodiments of the invention to produce soft metrics enables the output of more than one receiver to be utilized in the detection of a transmitted data sequence. In a number of embodiments, soft metrics generated by a set of multiple symbol noncoherent soft output detectors can be combined to improve the reliability of the detected data sequence. In several embodiments, the soft metrics can be used to discard the output of one or more multiple symbol noncoherent soft output detectors in a set of multiple symbol noncoherent soft output detectors when detecting data. In addition, the soft metrics can be utilized to select the most reliable output as the detected data sequence. Multiple symbol noncoherent soft output detectors and the use of LLRs when performing multiple symbol noncoherent detection in accordance with embodiments of the invention are discussed further below. In order to illustrate multiple symbol noncoherent detection techniques in accordance with embodiments of the invention, examples are provided with respect to the FM0 modulation technique used in common Radio Frequency Identification (RFID) applications. However, multiple symbol noncoherent soft output detectors in accordance with embodiments of the invention can be utilized in any of a variety of applications including applications involving Multiple Phase Shift Keying, and/or wireless, wired, optical communication channels and systems with channel coding.

Figure 1:
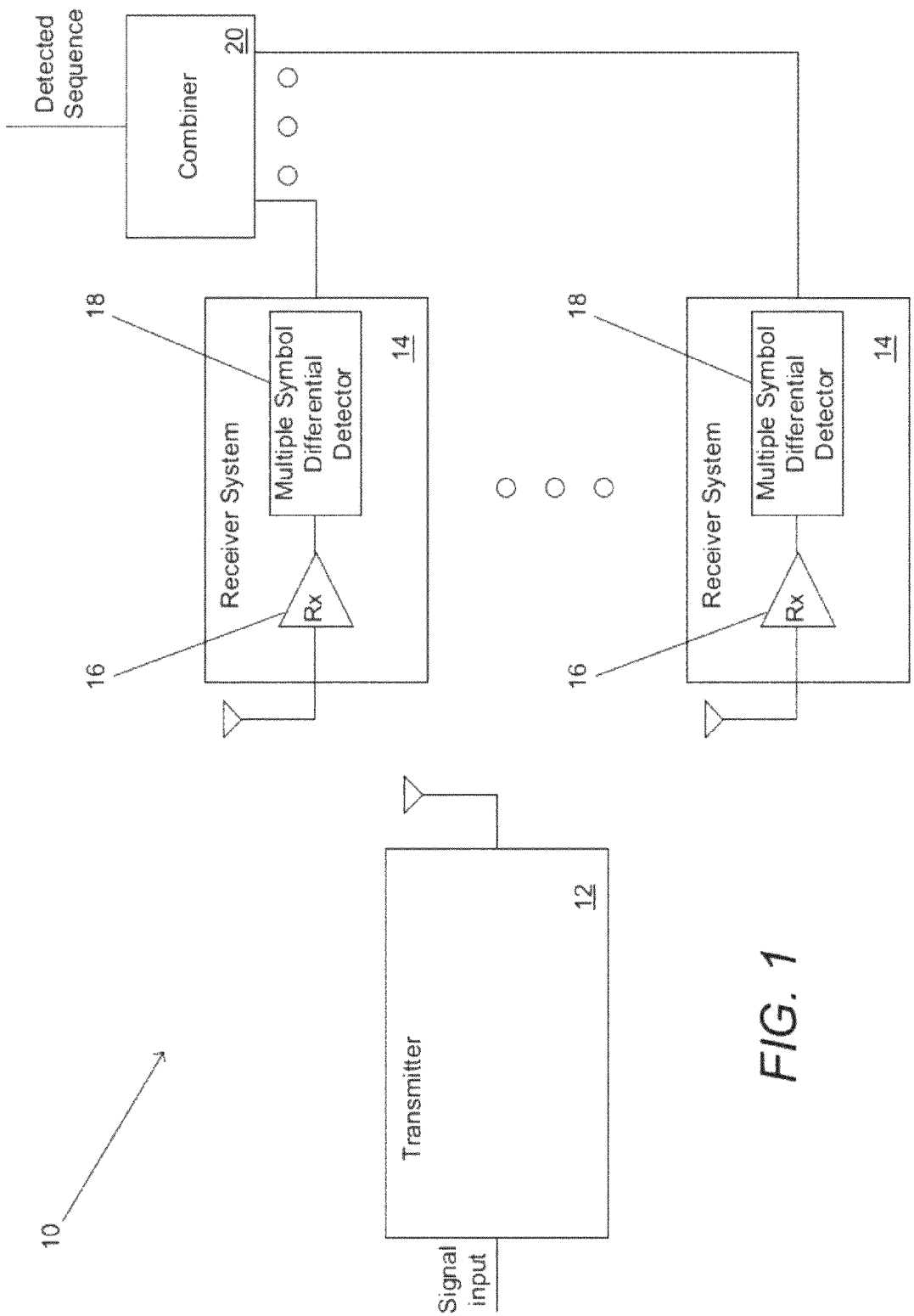
FIG. 1 conceptually illustrates a communication system in accordance with an embodiment of the invention.

Communication Systems Including Multiple Symbol Noncoherent Soft Output Detectors One or more multiple symbol noncoherent soft output detectors in accordance with embodiments of the invention can be utilized to detect data in almost any communication system that modulates the phase of the transmitted signal to communicate information and where the phase of the carrier signal on which the data is modulated remains relatively constant during the transmission of the data sequence. A communication system including a set of multiple symbol noncoherent soft output detectors in accordance with embodiments of the invention is illustrated in FIG. 1. The communication system 10 includes a transmitter 12 that modulates data symbols onto a carrier for transmission via a communication channel to one or more receiver systems 14. In the illustrated embodiment, a set of receiver systems 14 is provided and each receiver system includes a receiver 16 and a multiple symbol noncoherent soft output detector 18. The receivers 16 demodulate and sample the received signal. The samples are provided to the corresponding multiple symbol noncoherent soft output detector 18, which outputs soft metrics based upon the observations (i.e. the samples).

In several embodiments, the soft metrics based on the LLR are in fact the LLR of each symbol. In a number of embodiments, the soft metrics based on the LLR are approximations of the magnitude or square of the magnitude of the LLR. In other embodiments, any soft metric that provides information concerning the reliability of the detected symbol can be utilized. The soft metrics can be utilized to detect a received data sequence. In combined receiver systems where only one receiver system is present, the soft metrics output by the multiple symbol noncoherent soft output detector can be utilized to generate the received data sequence. In the illustrated embodiment, the soft metrics output by the multiple symbol noncoherent soft output detectors 18 are provided to a combiner 20. In a number of embodiments, the combiner 20 selects as the detected output a symbol or sequence of symbols based upon the output of the multiple symbol noncoherent soft output detector 18 that detects the symbol or sequence of symbols with the highest reliability. In several embodiments, combiner 20 combines the soft metrics from two or more of the multiple symbol noncoherent soft output detectors to generate the detected data sequence. The soft metrics utilized to generate the detected data sequence can be selected based upon reliability. Alternatively, the combiner 20 can simply combine the soft metrics of all of the multiple symbol noncoherent soft output detectors without regard to the reliability of any specific output.

Although the communication system shown in FIG. 1 shows the use of an antenna 20 to transmit the signal via free space, multiple symbol noncoherent soft output detectors in accordance with embodiments of the invention can be utilized in a variety of communication system including (but not limited to) wireless, wired, optical communication systems and systems with channel coding. An application of particular interest for multiple symbol noncoherent soft output detectors in accordance with embodiments of the invention is the detection of FM0 modulated data transmitted by Radio Frequency Identification (RFID) tags such as (but not limited to) Ultra High Frequency RFID tags that conform with the EPC Class 1 Generation 2 UHF Air Interface Protocol (EPC Gen 2) Standard specified by GS1 AISBL of Brussels, Belgium. Accordingly, much of the discussion that follows is in the context of detecting FM0 modulated signals. However, multiple symbol noncoherent soft output detectors in accordance with embodiments of the invention can generate soft metrics with respect to symbols generated using a variety of phase modulation techniques including (but not limited to) Multiple-Phase-Shift Keying (MPSK). If there is no known data available (e.g. no known pilot, or preamble) the modulation scheme used to transmit the data should inherently include differential encoding or a differential encoder should be used. However, if some known data is available a modulation scheme that does not include differential encoding can be used. Systems and methods for generating soft metrics in accordance with embodiments of the invention are discussed further below.

Generating Soft Metrics Using Multiple Symbol Noncoherent Soft Output Detection

Multiple symbol noncoherent soft output detectors in accordance with embodiments of the invention detect received symbols by generating soft metrics using observations of multiple symbols. In several embodiments, the multiple symbol noncoherent soft output detector generates soft metrics based on the LLR of each detected symbol. In order to illustrate the manner in which soft metrics based on LLRs can be utilized in the detection of a sequence of symbols, the following example is provided with respect to the detection of FM0 modulated symbols generated in accordance with the EPC Gen 2 standard. As is discussed further below, each data packet transmitted in accordance with the EPC Gen 2 standard includes a known pilot and preamble, which can be utilized by the receiver to improve the reliability of the detected data. Similar techniques can be utilized in communication systems that utilize other phase modulation techniques and/or for which the receiver system knows a portion of the transmitted sequence.

LLRs for FM0 Symbol Stream Including Pilot and Preamble Sequences

Figure 2A:
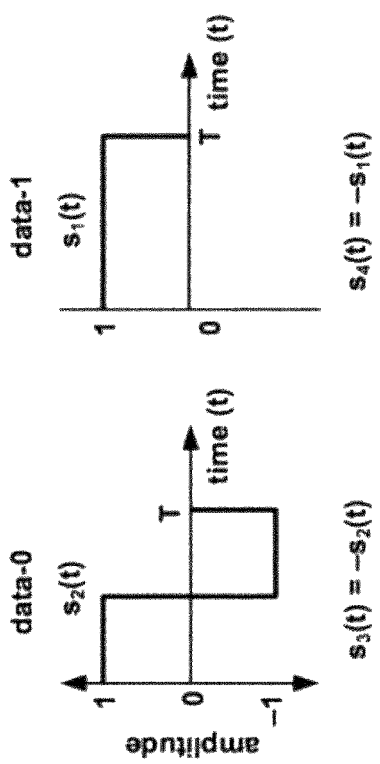
FIGS. 2A-2E illustrate the characteristics of FM0 modulated signals transmitted in accordance with the EPC Class 1 Generation 2 UHF Air Interface Protocol Standard.
Figure 2E:
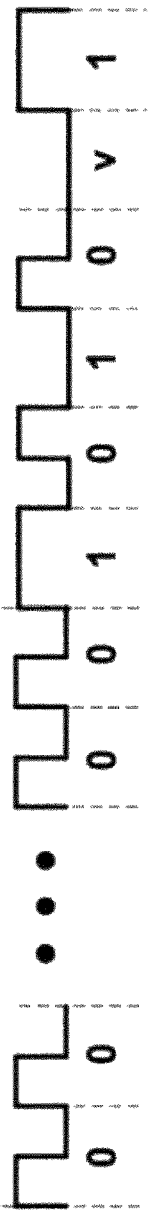
Figure 2C:
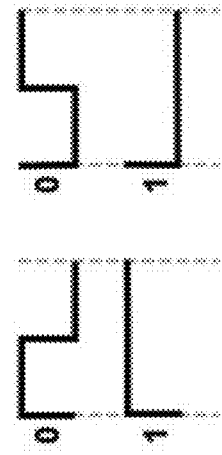
Figure 2B:
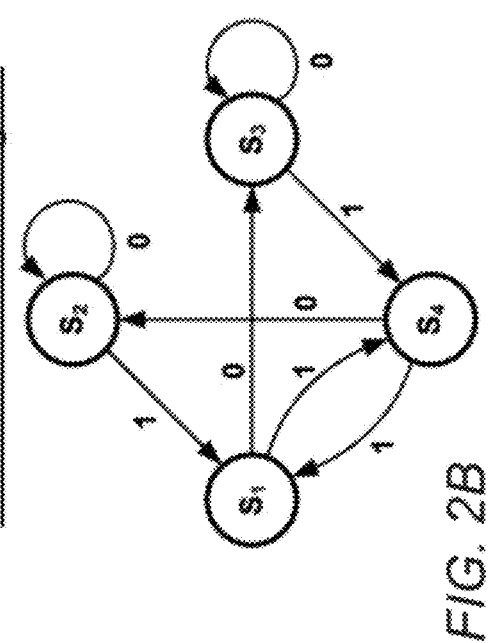
Figure 2D:
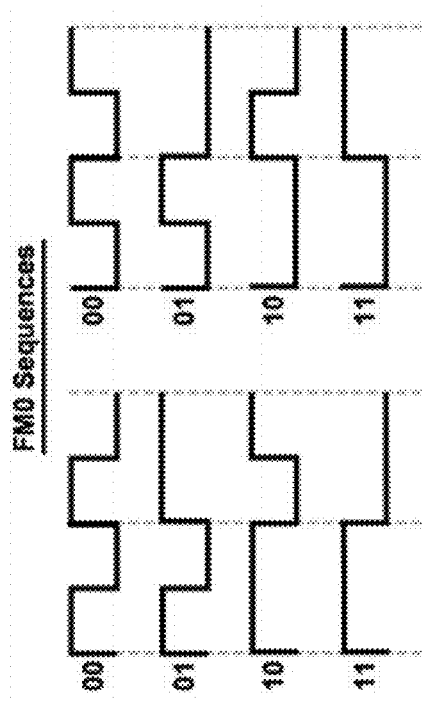

The FM0 basis functions are illustrated in FIG. 2A. A state diagram illustrating the manner in which FM0 modulated symbols are generated is illustrated in FIG. 2B. As can readily be appreciated from the state diagram, each FM0 symbol that is transmitted depends on the previous symbol. FM0 symbols transmitted depending upon the value of the previous symbol are illustrated in FIG. 2C. Two bit (two symbol) FM0 sequences are illustrated in FIG. 2D. The EPC Gen 2 standard specifies that a RFID tag can transmit FM0 modulated data preceded by a preamble. The interrogator can also request that the RFID tag initiate the transmission with a pilot sequence of 12 leading FM0 zeros. The pilot and preamble sequence of a packet transmitted in accordance with the EPC Gen 2 Standard is illustrated in FIG. 2E. Both the pilot and preamble are known to the receiver system. The detection of FM0 modulated data utilizing observations of the pilot and preamble in the generation of soft metrics is discussed further below. Increasing the number of observations using the pilot and preamble typically improves the reliability of the detected data sequence. Use of observations of known symbols is not, however, necessary to detect data using a multiple symbol noncoherent soft output detector in accordance with embodiments of the invention.

Consider the FM0 signaling where a data $d_k \in \{\pm 1\}$ generates data $x_{k,1} \in \{\pm 1\}$ and $x_{k,2} \in \{\pm 1\}$ such that $x_{k,2}=d_k x_{k-1,2}$ and $x_{k,1}=-x_{k-1,2}$.

Let $p_{k,i} \in \{\pm 1\}$; $k=1, \ldots N_p$; $i=1, 2$ represent the pilot and preamble samples which are known to the receiver. Let $x_{k,i} \in \{\pm 1\}$; $k=1, \ldots N_d$; $i=1, 2$ represent the data. The index $i=1$ represents the first half symbol, and $i=2$ represents the second half symbol for each time index k. Let $y_{k,i}$; $k=1, \ldots N_p$ and $r_{k,i}$; $k=1, \ldots N_d$; $i=1, 2$ represent the corresponding noisy complex received samples after half-symbol integrations (half symbol matched filtering). As is discussed further below, due to timing uncertainty, a number of matched filters having different numbers of samples can be utilized to integrate the samples during each half-symbol period to determine the most likely symbol duration. In the case of FM0, the integration typically commences halfway through the symbol interval. The carrier phase φ (uniformly distributed between 0 and 2π) can be assumed to be almost constant over time duration of pilot, preamble, and data during reception of a packet. Let $I_{m,n}$ represent a set of time indices k and i corresponding to a received data observation interval. In particular the assumption can be made that this set starts with k=m−1, i=2 and ends with k=m+n, i=1. The conditional probability is $$P(r \mid p, x, \varphi) = c_1 e^{\frac{A}{\sigma^2} Re\left(\sum_{k,i} y_{k,i} p_{k,i} e^{-j\varphi} + \sum_{k,i \in I_{m,n}} r_{k,i} x_{k,i} e^{-j\varphi}\right)} \quad (1)$$

where $c_1$ is a constant which depends only on observations. The expectation with respect to carrier phase φ is $$P(r \mid p, x) = E\{P(r \mid p, x, \varphi)\} = c_1 I_0\left(\frac{A}{\sigma^2}\left|\sum_{k,i} y_{k,i} p_{k,i} + \sum_{k,i \in I_{m,n}} r_{k,i} x_{k,i}\right|\right) \quad (2)$$

Note that $\sum_{k,i \in I_{m,n}} r_{k,i} x_{k,i} = \sum_{k=m}^{m+n}(r_{k-1,2} - r_{k,1}) x_{k-1,2}$ The LLR then can be computed as $$\lambda_k = \ln \frac{P(x_k = +1 \mid p, r)}{P(x_k = -1 \mid p, r)} = \ln \frac{\sum_{x: x_k=+1} P(x \mid p, r)}{\sum_{x: x_k=-1} P(x \mid p, r)} \quad (3)$$

For independent identically distributed data, the following approximation applies $$\lambda_k = \ln \frac{\sum_{x: x_k=+1} P(r \mid p, x)}{\sum_{x: x_k=-1} P(r \mid p, x)} \cong \ln \frac{\max_{x: x_k=+1} P(r \mid p, x)}{\max_{x: x_k=-1} P(r \mid p, x)} \quad (4)$$

or $$\lambda_k \cong \max_{x: x_k=+1} \ln P(r \mid p, x) - \max_{x: x_k=-1} \ln P(r \mid p, x) \quad (5)$$

Using $\ln\{I_0(x)\} \cong x$, then for some $j \in \{m, \ldots, m+n\}$ the LLR can be obtained as $$\lambda_j \cong \frac{A}{\sigma^2}\left\{\max_{x: x_j=+1}\left|\sum_{k,i} y_{k,i} p_{k,i} + \sum_{k=m}^{m+n}(r_{k-1,2} - r_{k,1}) x_{k-1,2}\right| - \max_{x: x_j=-1}\left|\sum_{k,i} y_{k,i} p_{k,i} + \sum_{k=m}^{m+n}(r_{k-1,2} - r_{k,1}) x_{k-1,2}\right|\right\} \quad (6)$$

Although the above formulation assumes that the phase modulation takes one of two values, a multiple symbol noncoherent soft output detector can be constructed in accordance with embodiments of the invention that generates a LLR with respect to each possible symbol in an M-ary PSK modulation scheme. In several embodiments, the soft metric is determined relative to the likelihood of an arbitrarily selected reference symbol value. Referring back to the case where the phase can take one of two values, the generation of LLRs using observations over 3-symbol FM0 modulated sequences in accordance with embodiments of the invention.

LLR for 3-Bit Duration

Assuming that time synchronization is already acquired, the term $|\sum_{k,i} y_{k,i} p_{k,i} + \sum_{k=m}^{m+n}(r_{k-1,2}-r_{k,1}) x_{k-1,2}|$ can be written for a 3-bit (3 symbol) estimation as $$\left|\sum_{k,i} y_{k,i} p_{k,i} + (r_{m-1,2} - r_{m,1}) x_{m-1,2} + \right. \quad (7)$$
$$\left. (r_{m,2} - r_{m+1,1}) x_{m,2} + (r_{m+1,2} - r_{m+2,1}) x_{m+1,2}\right|$$

Since $x_{m,2}=d_m x_{m-1,2}$, $x_{m+1,2}=d_{m+1}d_m x_{m-1,2}$ (7) can be rewritten as $$f(x_{m-1,2}, d_m, d_{m+1}, t) \triangleq \left| \sum_{k,i} y_{k,i} p_{k,i} + x_{m-1,2}[(r_{m-1,2}-r_{m,1}) + (r_{m,2}-r_{m+1,1})d_m + (r_{m+1,2}-r_{m+2,1})d_m d_{m+1}] \right| \quad (8)$$

where t corresponds to timing index.

The detector of an RFID receiver such as the RFID Receiver described in U.S. Pat. No. 7,633,377 entitled "RFID Receiver" to Ramin Sadr (the disclosure of which is incorporated by reference herein in its entirety) can be replaced with a multiple symbol noncoherent soft output detector in accordance with an embodiment of the invention. The RFID receiver described in U.S. Pat. No. 7,633,377 provides time synchronization using the pilot and preamble symbols to within +/−1 sample. For punctual timing (no timing error) set t=0, for early timing (by one sample forward) set t=+1, and for late timing (by one sample backward) set t=−1. This index t namely −1, 0, or +1 corresponds to the starting time of matched filtering (integrate and dump for FM0 pulses). When time synchronization is provided with respect to t=−1, 0, and +1, soft metrics for each time index can be obtained as follows using a multiple symbol noncoherent soft output detector in accordance with embodiments of the invention.

With these notations then the conditional LLR for time index t for information data is $$\lambda(d_m, t) = \frac{A}{\sigma^2} \left\{ \max_{x_{m-1,2}, d_{m+1}} f(x_{m-1,2}, 1, d_{m+1}, t) - \max_{x_{m-1,2}, d_{m+1}} f(x_{m-1,2}, -1, d_{m+1}, t) \right\} \quad (9)$$

The timing correction can be obtained as $$\hat{t} = \arg\max_{t=-1,0,+1}\{|\lambda(d_m, t)|\} \quad (10)$$

then the unconditional LLR for time index $\hat{t}$ for information data is $\lambda(d_m) \triangleq \lambda(d_m, \hat{t})$. As can readily be appreciated, time synchronization may be less precise and a greater number of conditional LLRs are calculated in determining the timing correction.

The $|\Sigma_{k,i} y_{k,i} p_{k,i}|$ can be used as an estimate for amplitude A. The 3-bit (3 symbol) window can then be slid by one bit (symbol) duration and the process repeated to correct timing and obtain the LLR for the next bit (symbol).

Combining LLRs

LLRs determined using processes similar to those outlined above can be combined at the output of detectors for n receivers as $$\lambda(d_m) = \Sigma_{i=1}^n \lambda_i(d_m) \quad (11)$$

The final decision on information data $d_m$ is $$\hat{d}_m = \text{sign}(\lambda(d_m)) \quad (12)$$

As noted above, reliability thresholds can be applied to the soft metrics determined by each receiver and soft metrics that indicate low reliability can be excluded from the final decision. In many embodiments, the final decision is based on the soft metrics that indicates the highest reliability.

Hardware Implementations of 3-bit FM0 Multiple Symbol Noncoherent Soft Output Detectors RFID receivers that implement 3-bit multiple symbol detectors that perform hard decision detection are described in U.S. Pat. No. 7,633,377 (incorporated by reference above). In U.S. Pat. No. 7,633,377, the metric shown in FIG. 15d and equation (41) is formulated based on the property of FM0 modulation that $x_{m,2}=d_m x_{m-1,2}$, $x_{m,1}=-x_{m-1,2}$ as follows (utilizing the notation presented above)

$$|(r_{m-1,2}-r_{m,1})d_m + (r_{m,2}-r_{m+1,1}) + (r_{m+1,2}-r_{m+2,1})d_m d_{m+1}| \quad (13)$$

When the same metric is formulated based on the property of FM0 modulation that $x_{m,2}=d_m x_{m-1,2}$, $x_{m+1,2}=d_{m+1}d_m x_{m-1,2}$, the following equivalent metric is obtained $$|(r_{m-1,2}-r_{m,1})+(r_{m,2}-r_{m+1,1})d_m+(r_{m+1,2}-r_{m+2,1})d_m d_{m+1}| \quad (14)$$

or equivalently $$g(d_m, d_{m+1})=|(r_{m-1,2}-r_{m,1})+(r_{m,2}-r_{m+1,1})d_m+(r_{m+1,2}-r_{m+2,1})d_m d_{m+1}|^2 \quad (15)$$

A hard decision can be performed to determine $d_m$ as $$\hat{d}_m = \arg\max_{d_m, d_{m+1}} g(d_m, d_{m+1}) \quad (16)$$

When accounting for timing correction, this becomes $$g(d_m, d_{m+1}, t)=|[(r_{m-1,2}-r_{m,1})+(r_{m,2}-r_{m+1,1})d_m+(r_{m+1,2}-r_{m+2,1})d_m d_{m+1}]|^2 \quad (17)$$

where t is for timing correction.

A hard decision can be performed to detect $d_m$ as $$\hat{d}_m = \arg\max_{t=-1,0,+1} \max_{d_m, d_{m+1}} g(d_m, d_{m+1}, t) \quad (18)$$

However the above $g(d_m, d_{m+1}, t)$ is equivalent to $$g(d_m, d_{m+1}, t)=|[(r_{m-1,2}-r_{m,1})d_m+(r_{m,2}-r_{m+1,1})+(r_{m+1,2}-r_{m+2,1})d_m d_{m+1}]|^2 \quad (19)$$

or from the point of data decision and timing is also equivalent to $$g(d_m, d_{m+1}, t)=|(r_{m-1,2}-r_{m,1})+(r_{m,2}-r_{m+1,1})d_m+(r_{m+1,2}-r_{m+2,1})d_m d_{m+1}| \quad (20)$$

Accordingly, a multiple symbol noncoherent soft output detector can be implemented with minor modification to the detector disclosed U.S. Pat. No. 7,633,377 by using the correlations that were generated prior to the hard decision to generate the soft output as follows:

$$\lambda(d_m, t) = \frac{A}{\sigma^2} \{\max_{d_{m+1}} g'(1, d_{m+1}, t) - \max_{d_{m+1}} g'(-1, d_{m+1}, t)\} \quad (21)$$

where $$g'(d_m, d_{m+1}, t) = |(r_{m-1,2}-r_{m,1})+(r_{m,2}-r_{m+1,1})d_m+(r_{m+1,2}-r_{m+2,1})d_m d_{m+1}|$$

However, an approximation can be used if power computation is easier than complex absolute value calculation as $$\lambda(d_m, t) = \frac{A}{\sigma^2} \{\max_{d_{m+1}} g(1, d_{m+1}, t) - \max_{d_{m+1}} g(-1, d_{m+1}, t)\} \quad (22)$$

-continued where $$g(d_m, d_{m+1}, t) =$$
$$|(r_{m-1,2} - r_{m,1}) + (r_{m,2} - r_{m+1,1})d_m + (r_{m+1,2} - r_{m+2,1})d_m d_{m+1}|^2$$

$$A = \left|\sum_{k,i} y_{k,i} p_{k,i}\right|$$

which comes from preamble synchronization circuits. If complex absolute value computation cannot be done, $A^2$ can be used as an approximation.

Figure 3:
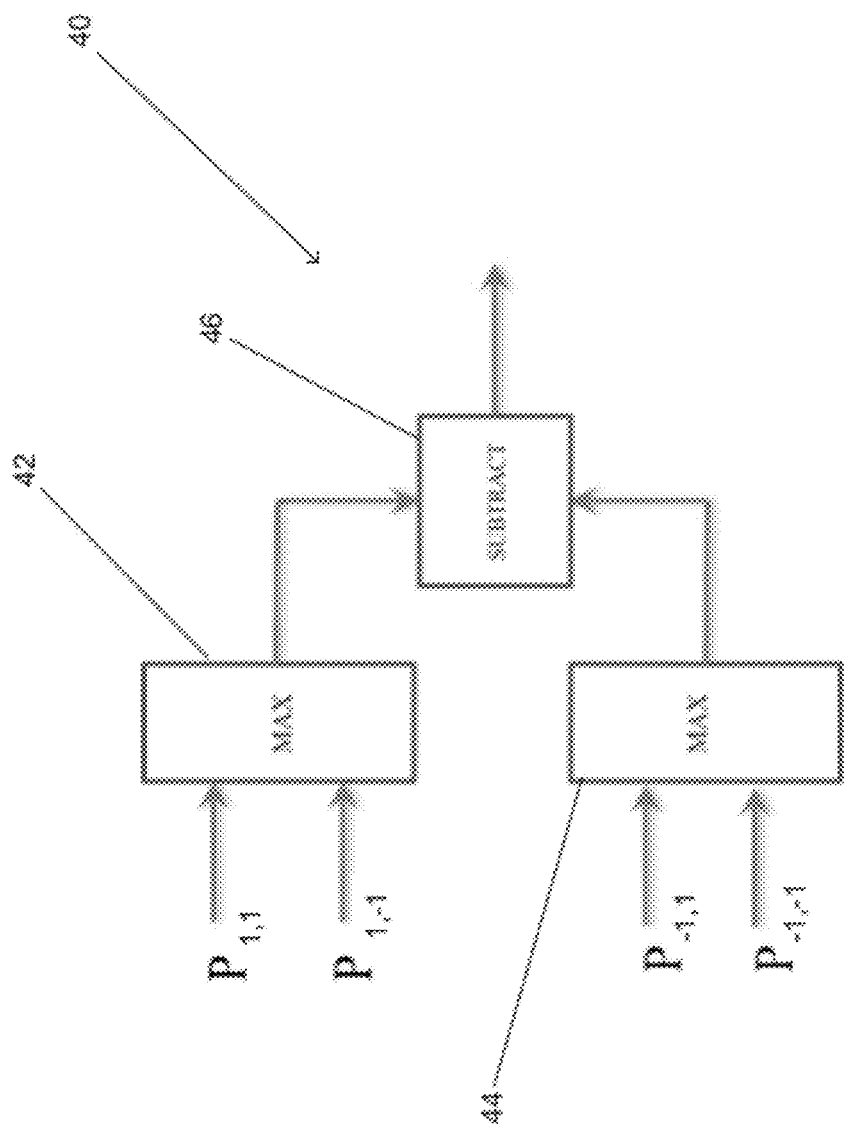
FIG. 3 illustrates the manner in which a hard decision FM0 3-bit multiple symbol noncoherent soft output detector can be modified to generate soft metrics.

Based upon the above discussion, the hardware implementation of the detector disclosed in U.S. Pat. No. 7,633,377 can be modified by replacing the maximum operation in the hardware implementation of the hard detection decision $$\left(\text{i.e.} \max_{d_m, d_{m+1}} g(d_m, d_{m+1}, t)\right)$$

with two maximum operation blocks that are subtracted (i.e. $\max_{d_{m+1}} g(1, d_{m+1}, t) - \max_{d_{m+1}} g(-1, d_{m+1}, t)$). The modification to the detector disclosed in U.S. Pat. No. 7,633,377 to achieve a multiple symbol noncoherent soft output detector in accordance with embodiments of the invention is illustrated in FIG. 3. The power computation $g(d_m, d_{m+1}, t)$ is represented as $P_{d_m, d_{m+1}}$. The maximum value of $P_{1,1}$ and $P_{1,-1}$ is determined using a first maximum block 42 and the maximum value of $P_{-1,1}$ and $P_{-1,-1}$ is determined using a second maximum block 44. The two maximums are then subtracted using a subtraction block 46 to generate a value proportional to the LLR $\lambda(d_m, t)$. The result of the subtraction can be weighted by A or $A^2$ to produce a soft metric based on the LLR. Obtaining soft metrics using the above hardware implementation does not alter the timing correction scheme utilized by the hardware detector.

For symbol stream combining, the timing of the soft metrics from two or more receivers should be aligned. In instances where the receivers are in close vicinity of each other and data rates are low, such additional timing alignment is not as important. When combining soft outputs from multiple receivers, the noise variances for identical RF front ends for two or more receivers with the same Noise Figure (NF) are almost the same. Therefore, $\sigma^2$ need not be calculated for each receiver. If this is not the case, then for each receiver in addition to received amplitude (or power) computation the received noise variance $\sigma^2$ is calculated prior to combining.

Although a specific hardware implementation is discussed above based upon modifying the RFID receiver disclosed in U.S. Pat. No. 7,633,377, any of a variety of receiver designs can be utilized to implement multiple symbol noncoherent soft output detectors that produce soft outputs in accordance with embodiments of the invention. Additional functionality including (but not limited to) collision detection that can be supported by a receiver configured to produce soft metrics in accordance with embodiments of the invention are discussed further below.

Collision Detection

The soft metrics generated by a multiple symbol noncoherent soft output detector in accordance with an embodiment of the invention can be utilized to perform collision detection. Referring again to the example of FM0 modulated data transmitted by RFID tags in accordance with the EPC Gen 2 standard, RFID collision detection can be performed using the soft metrics generated when detecting an RFID tag's RN16 query response. The RN16 query response is a 16 bit random number that is assigned to each tag. As is discussed further below, a collision during the transmission of the RN16 bits can be detected using the soft metrics based on LLRs of the 16 bits detected by a multiple symbol noncoherent soft output detector in accordance with embodiments of the invention.

Assuming that the preamble is already detected, the LLR based on observed 3-bit (symbol) duration utilized for performing collision detection is as follows:

$$\lambda_i = \max_d |(r_{i-1,2} - r_{i,1}) + (r_{i,2} - r_{i+1,1}) + (r_{i+1,2} - r_{i+2,1})d| - \max_d |(r_{i-1,2} - r_{i,1}) - (r_{i,2} - r_{i+1,1}) - (r_{i+1,2} - r_{i+2,1})d| \quad (23)$$

This LLR can be computed for i=1, 2, 3, ..., 15. For simplicity $$\frac{A}{\sigma^2}$$

is dropped in (23). On the edges of RN16, $r_{0,2}$ is known from the last one-half symbol observation from the preamble sequence. For $r_{17,1}$ since it is not available we set $r_{17,1} = -r_{16,2}$. The method is based on observing $|\lambda_i|$ for i=1, 2, 3, ..., 15.

When there is no collision:

$$r_{k,i} = A_1 x_{k,i} e^{j\phi_1} + n_{k,i} \quad (24)$$

When two tags collide:

$$r_{k,i} = A_1 x_{k,i} e^{j\phi_1} + A_2 x'_{k,i} e^{j\phi_2} + n_{k,i} \quad (25)$$

All phases are unknown and uniformly distributed.

One method to discriminate collision versus no collision is to use variance of LLR over the 15-bit (symbol) received RN16 transmission. The variance can be defined as:

$$\text{Var} = \frac{1}{15}\sum_{i=1}^{15}|\lambda_i|^2 - \left(\frac{1}{15}\sum_{i=1}^{15}|\lambda_i|\right)^2 \quad (26)$$

The variance can be compared to a threshold to detect collisions. In several embodiments, a threshold TH=m|corr| is utilized, where "corr" represent the result of preamble correlation normalized by the number of one half symbols used in the preamble, and m is a number that can be set based on a desired false detection probability appropriate to a specific application. Based on the above, the magnitude of "corr" can be expressed as $$|\text{corr}| = \frac{1}{2N_p}\left|\sum_{k,i} y_{k,i} p_{k,i}\right| \quad (27)$$

Figure 4A:
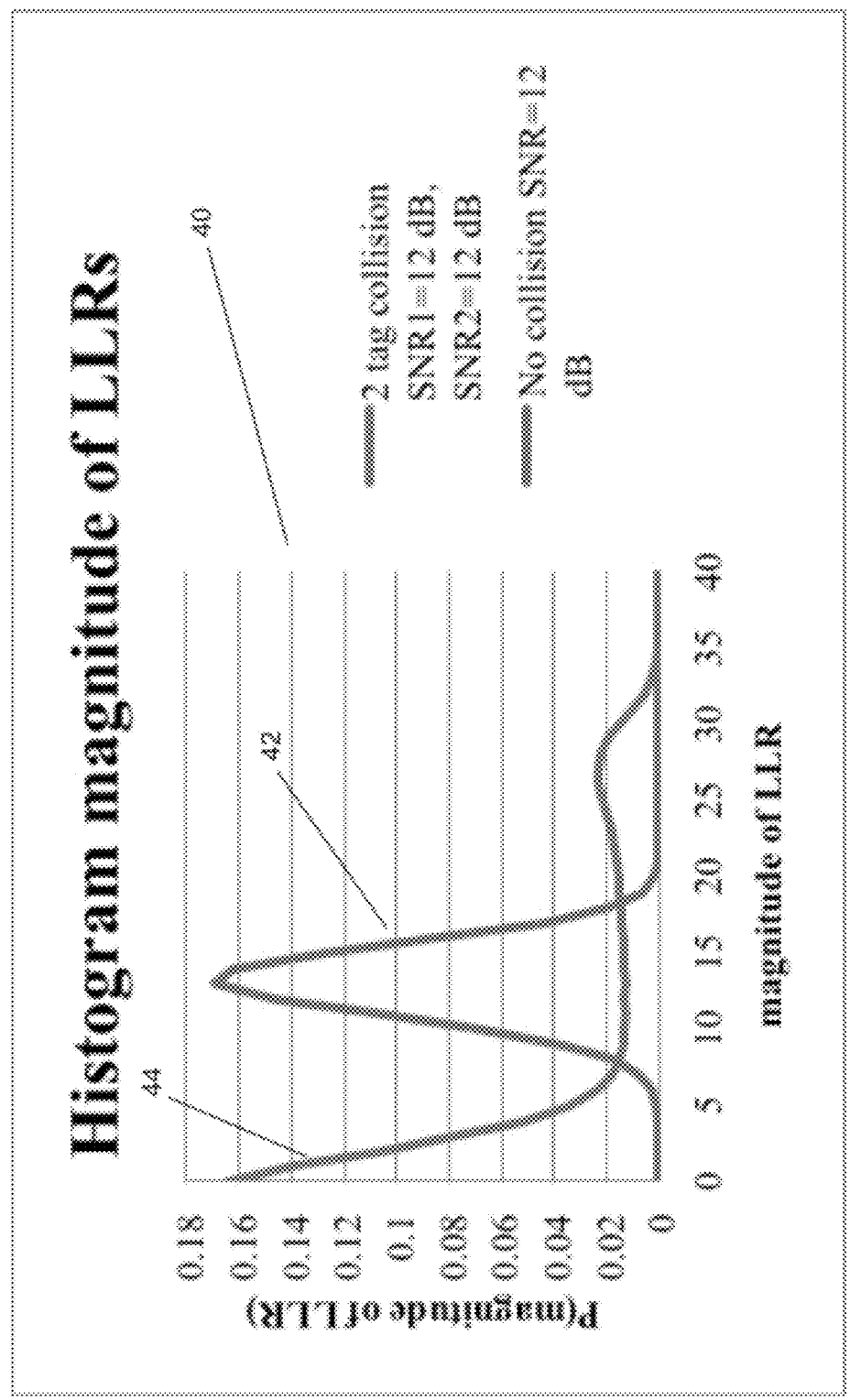
FIGS. 4A and 4B are histograms illustrating LLR simulations for the cases of no collision and a two tag collision.
Figure 4B:
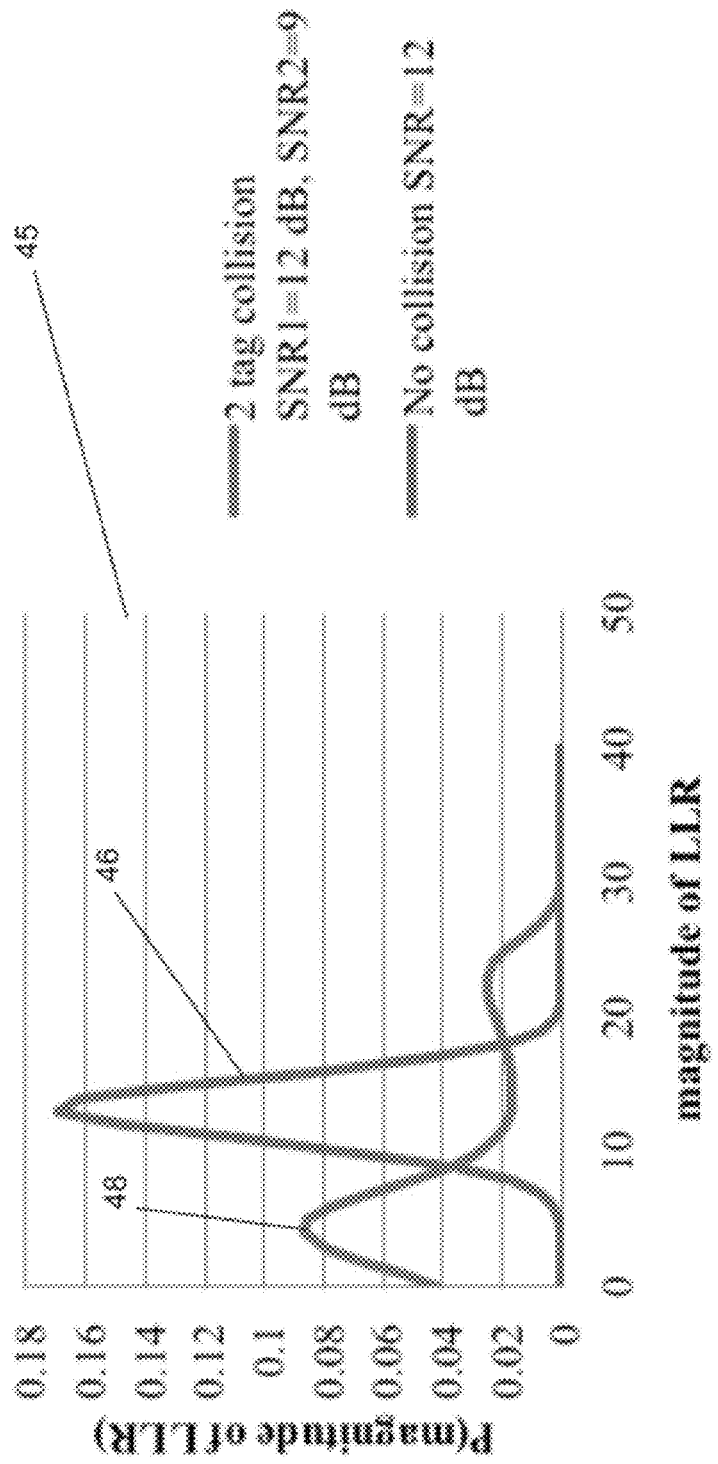
Figure 5A:
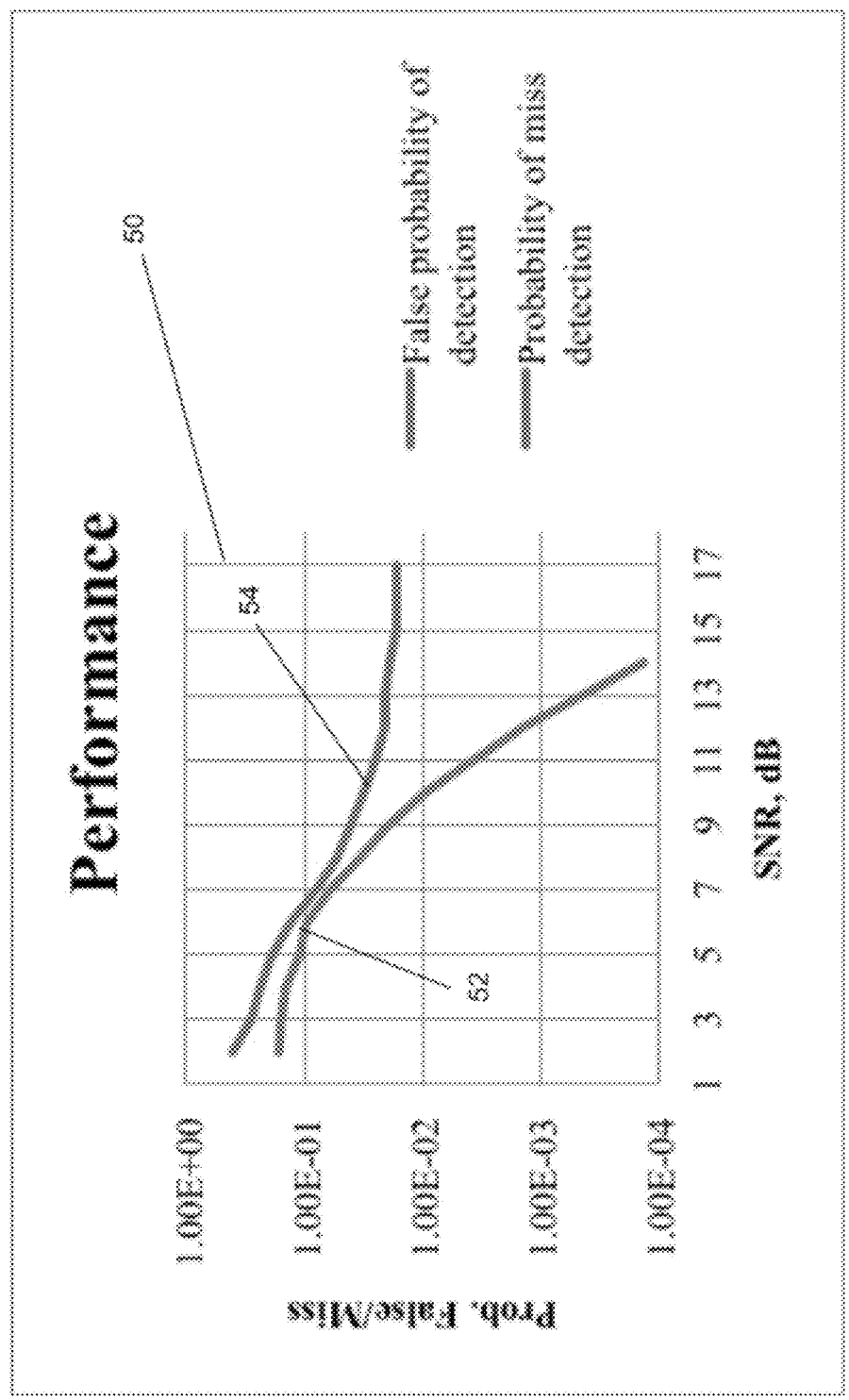
FIGS. 5A and 5B are charts illustrating the simulated probability of false detection and the probability of miss detection for the cases of no collision and a two tag collision.
Figure 5B:
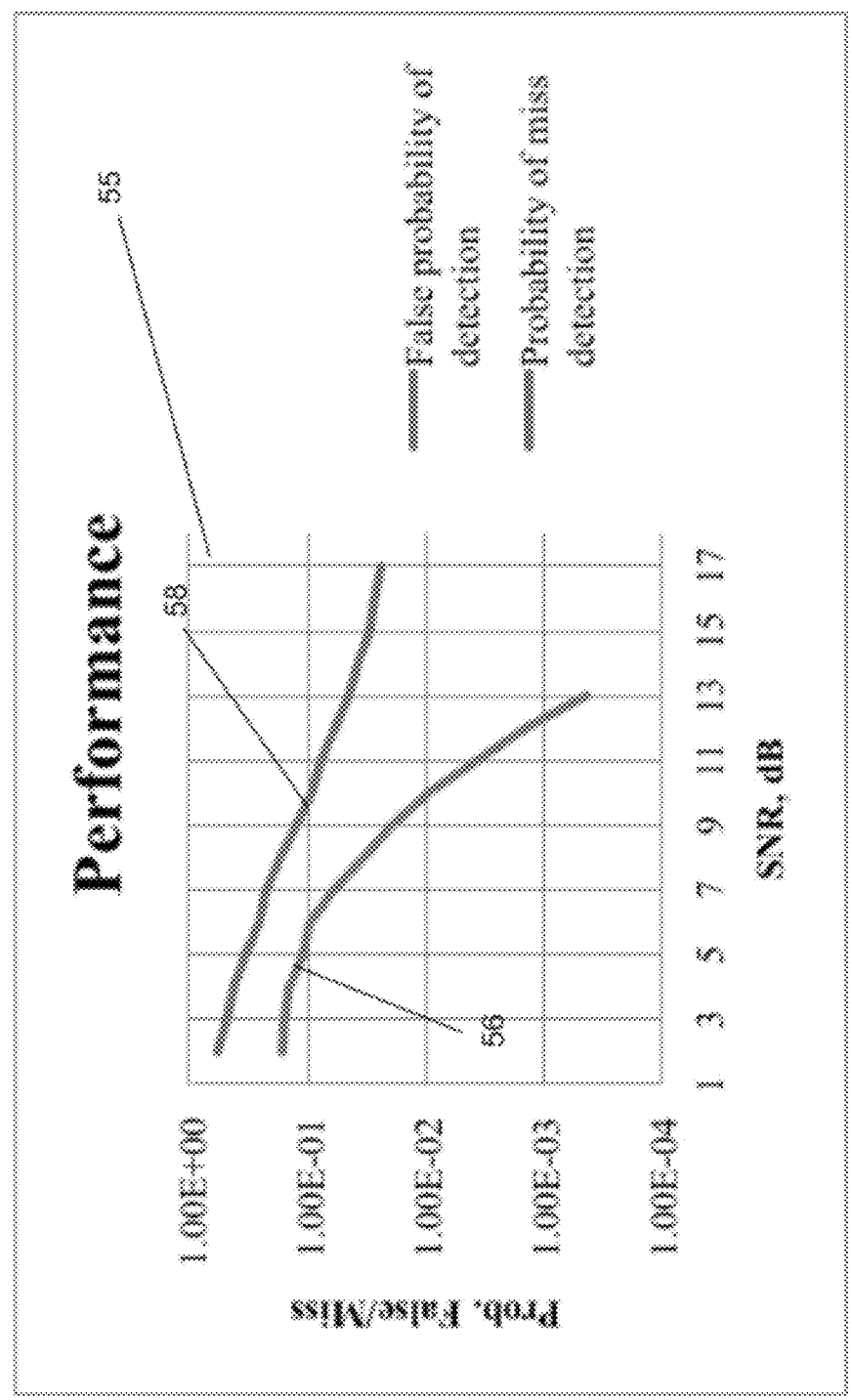

If Var>TH then there is a collision. A histogram of LLR simulations for two cases of no collision and two tag collision where the received SNR of each of the colliding signals is the same is illustrated in FIG. 4A. The histogram 40 illustrates that when there is no collision, the magnitude of the LLR is likely to have a distinct peak 42 above a threshold. When two tags collide, the magnitude of the LLR 44 is likely below the threshold. Similarly, a histogram of LLR simulations for two cases of no collision and a two tag collision where the received SNR of the first tag is 12 dB and the received SNR of the second tag is 9 dB is illustrated in FIG. 4B. Despite the signal of one tag dominating during the collision, the magnitude of the LLR of the 2 tag collision (48) is shown in the histogram 45 as being most likely below the threshold that is likely to be exceeded by the LLR of the no collision signal (46). A simulation of the probability of a false detection and the probability of a miss detection when the colliding tags have the same SNR is illustrated in FIG. 5A. As can be seen from the chart 50, both the probability of false detection (52) and the probability of miss detection decrease with increased SNR. The probability of false detection (52) trails off considerably relative to the probability of miss detection with increased SNR due to the effectiveness of the LLR magnitude threshold in identifying two tag collisions. As can be seen in FIGS. 4A and 4B, a certain proportion of 2 tag collisions will result in a signal with an LLR magnitude that exceeds the threshold. Therefore, the probability of miss detection does not diminish as steeply with increased SNR. FIG. 5B is a similar chart to FIG. 5A with the exception that the simulation involves a two tag collision, where the SNR of the signal received from the first tag is 3 dB greater than the signal received from the second tag. As can be seen from the chart 55, the probability of false detection (56) and the probability of miss detection (58) exhibit similar characteristics even when the signal of one tag dominates. Accordingly, the simulations indicate that the stronger the received signal the more likely that the LLR magnitude output by the multiple symbol noncoherent soft output detector can be utilized to accurately detect collisions.

Although specific procedures for performing collision detection in RFID system using LLR magnitudes are discussed above, any of a variety of techniques utilizing LLR magnitudes and/or other soft metrics can be utilized to perform collision detection in a variety of applications including (but not limited to) RFID tag interrogation in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A receiver system, comprising:
a receiver configured to receive and sample a phase modulated input signal, where the phase modulated input signal is a FM0 modulated signal comprising a plurality of symbols; and
a multiple symbol noncoherent soft output detector configured to receive the sampled phase modulated input signal and to generate a soft metric indicative of the reliability of a detected symbol based upon observations over multiple symbols of the phase modulated input signal, where the soft metric is computed as $$\lambda_{j,2} \cong \frac{A}{\sigma^2} \left\{ \max_{x:x_{j,2}=+1} \left| \sum_{k,i} y_{k,i} p_{k,i} + \sum_{k=m}^{m+n} (r_{k-1,2} - r_{k,1}) x_{k-1,2} \right| - \right.$$

$$\left. \max_{x:x_{j,2}=-1} \left| \sum_{k,i} y_{k,i} p_{k,i} + \sum_{k=m}^{m+n} (r_{k-1,2} - r_{k,1}) x_{k-1,2} \right| \right\}$$

where A represents an estimate of amplitude; $\sigma^2$ represents an estimate of received noise variance; $x_{j,i}$ represents value of the symbol at time index j,i; $x_{k,i}$ represents data at time index k,i; $p_{k,i}$ represents pilot/preamble samples when they are provided to the receiver; i is an index that represents the first half symbol (i=1) and second half symbol (i=2) observation at each time index k and j; $y_{k,i}$ represents received samples of the pilot/preamble after half-symbol integrations commencing halfway through the symbol interval when they are provided to the receiver $r_{k,i}$ represents received samples of the data after half-symbol integrations commencing halfway through the symbol interval; and m and n are indexes such that the set of observations $r_{k,i}$ is assumed to start with k=m−1, i=2 and end with k=m+n, i=1; j ∈ {m, . . . , m+n}.

2. The receiver system of claim 1, wherein the soft metric is based on the Log Likelihood Ratio of the detected symbol based upon observations over multiple symbols.

3. The receiver system of claim 2, wherein the observations include at least one known symbol.

4. The receiver system of claim 2, wherein the observations include observations over a three symbol sequence.

5. The receiver system of claim 1, wherein:
the phase modulated input signal comprises data that is phase modulated on a carrier; and
the multiple symbol noncoherent soft output detector assumes that carrier phase of the input signal is constant over the time duration of the observations.

6. The receiver system of claim 1, wherein:
the multiple symbol noncoherent soft output detector comprises a plurality of matched filters having different numbers of samples configured to integrate the samples during each half-symbol period; and
the multiple symbol noncoherent soft output detector is configured to use the outputs of each of the plurality of matched filters to determine the most likely symbol duration.

7. A combined receiver system, comprising:
a plurality of receivers configured to receive and sample an input signal, where the input signal is a FM0 modulated signal comprising a plurality of symbols conveying data that is phase modulated onto a carrier;
a plurality of multiple symbol noncoherent soft output detectors each configured to receive a sampled phase modulated input signal from one of the plurality of receivers and to generate a soft metric indicative of the reliability of a detected symbol based upon observations over multiple symbols of the phase modulated input signal, where each soft metric is computed as $$\lambda_{j,2} \cong \frac{A}{\sigma^2} \left\{ \max_{x:x_{j,2}=+1} \left| \sum_{k,i} y_{k,i} p_{k,i} + \sum_{k=m}^{m+n} (r_{k-1,2} - r_{k,1}) x_{k-1,2} \right| - \right.$$

$$\left. \max_{x:x_{j,2}=-1} \left| \sum_{k,i} y_{k,i} p_{k,i} + \sum_{k=m}^{m+n} (r_{k-1,2} - r_{k,1}) x_{k-1,2} \right| \right\}$$

where A represents an estimate of amplitude; $\sigma^2$ represents an estimate of received noise variance; $x_{j,i}$ represents value of the symbol at time index j,i; $x_{k,i}$ represents data at time index k,i; $p_{k,i}$ represents pilot/preamble samples when they are provided to the receiver; i is an index that represents the first half symbol (i=1) and second half symbol (i=2) observation at each time index k and j; $y_{k,i}$ represents received samples of the pilot/preamble after half-symbol integrations commencing halfway through the symbol interval when they are provided to the receiver $r_{k,i}$ represents received samples of the data after half-symbol integrations commencing halfway through the symbol interval; and m and n are indexes such that the set of observations $r_{k,i}$ is assumed to start with k=m−1, i=2 and end with k=m+n, i=1; j ∈ {m, . . . , m+n}; and a combiner configured to receive the soft metrics from the plurality of multiple symbol noncoherent soft output detectors and to detect data based upon the soft metrics.

8. The combined receiver system of claim 7, wherein the combiner is configured to detect data by combining the soft metrics.

9. The combined receiver system of claim 7, wherein the combiner is configured to select at least one of the soft metrics from the plurality of multiple symbol noncoherent soft output detectors based upon a threshold level of reliability.

10. The combined receiver system of claim 7, wherein the soft metrics generated by the plurality of multiple symbol noncoherent soft output detectors are based on the Log Likelihood Ratio of the detected symbol based upon observations over multiple symbols.

11. The combined receiver system of claim 10, wherein the observations include at least one known symbol.

12. The combined receiver system of claim 10, wherein the observations include observations over a three symbol sequence.

13. The combined receiver system of claim 7, wherein each of the plurality of multiple symbol noncoherent soft output detectors assumes that carrier phase of the input signal is constant over the time duration of the observations.

14. The combined receiver system of claim 7, wherein:
each of the plurality of multiple symbol noncoherent soft output detectors comprises a plurality of matched filters having different numbers of samples configured to integrate the samples during each half-symbol period; and
each of the plurality of multiple symbol noncoherent soft output detectors is configured to use the outputs of each of the plurality of matched filters to determine the most likely symbol duration.

15. A radio frequency identification (RFID) receiver system configured to detect phase modulated data transmitted by RFID tags, the RFID receiver system comprising:
an antenna configured to receive a phase modulated signal where the phase modulated signal is a FM0 modulated signal comprising a plurality of symbols transmitted by an RFID tag;
a receiver configured to sample the phase modulated signal; and
a multiple symbol noncoherent soft output detector configured to receive the sampled phase modulated input signal and to generate soft metrics indicative of the reliability of a detected symbol based upon observations over multiple symbols of the phase modulated input signal, where each soft metric is computed as $$\lambda_{j,2} \cong \frac{A}{\sigma^2} \left\{ \max_{x:x_{j,2}=+1} \left| \sum_{k,i} y_{k,i} p_{k,i} + \sum_{k=m}^{m+n} (r_{k-1,2} - r_{k,1}) x_{k-1,2} \right| - \max_{x:x_{j,2}=-1} \left| \sum_{k,i} y_{k,i} p_{k,i} + \sum_{k=m}^{m+n} (r_{k-1,2} - r_{k,1}) x_{k-1,2} \right| \right\}$$

where A represents an estimate of amplitude; $\sigma^2$ represents an estimate of received noise variance; $x_{j,i}$ represents value of the symbol at time index j,i; $x_{k,i}$ represents data at time index k,i; $p_{k,i}$ represents pilot/preamble samples when they are provided to the receiver; i is an index that represents the first half symbol (i=1) and second half symbol (i=2) observation at each time index k and j; $y_{k,i}$ represents received samples of the pilot/preamble after half-symbol integrations commencing halfway through the symbol interval when they are provided to the receiver; $r_{k,i}$ represents received samples of the data after half-symbol integrations commencing halfway through the symbol interval; and m and n are indexes such that the set of observations $r_{k,i}$ is assumed to start with k=m−1, i=2 and end with k=m+n, i=1; j ∈ {m, . . . , m+n}.

16. The RFID receiver system of claim 15, wherein the soft metric is based on the Log Likelihood Ratio of the detected symbol based upon observations over multiple symbols.

17. The RFID receiver system of claim 16, wherein:
the multiple symbol noncoherent soft output detector comprises a plurality of matched filters having different numbers of samples configured to integrate the samples during each half-symbol period; and
the multiple symbol noncoherent soft output detector is configured to use the outputs of each of the plurality of matched filters to determine the most likely symbol duration.

18. The RFID receiver system of claim 16, wherein the multiple symbol noncoherent soft output detector is configured to detect RFID tag transmission collisions based upon the LLRs of the detected symbols.

19. The RFID receiver system of claim 16, wherein the phase modulated signal comprising symbols transmitted by an RFID tag is a phase modulated signal comprising symbols backscattered by an RFID tag.

20. The RFID receiver system of claim 15, wherein the FM0 modulated input signal comprises a known preamble sequence and an unknown data sequence.

21. The RFID receiver system of claim 20, wherein the observations include observations over at least one symbol in the preamble sequence and at least one symbol in the unknown data sequence.

22. The RFID receiver system of claim 21, wherein the observations include observations over the entire preamble and at least three symbols in the unknown data sequence.

23. The RFID receiver system of claim 20, wherein:
the FM0 modulated input signal further comprises a known pilot sequence; and
the observations include observations over the entire pilot and preamble and at least three symbols in the unknown data sequence.

24. The RFID receiver system of claim 20, wherein the multiple symbol noncoherent soft output detector assumes that carrier phase of the input signal is constant over the time duration of the observations.

25. A combined radio frequency identification (RFID) receiver system configured to detect phase modulated data transmitted by an RFID tag, the RFID receiver system comprising:
- a plurality of antennas configured to receive an input signal transmitted by an RFID tag, where the input signal is a FM0 modulated signal comprising a plurality of symbols conveying data that is phase modulated onto a carrier;
- a plurality of receivers configured to sample the phase modulated signal from at least one of the plurality of antennas;
- a plurality of multiple symbol noncoherent soft output detectors configured to receive the sampled phase modulated input signal from one of the plurality of receivers and to generate soft metrics indicative of the reliability of a detected symbol based upon observations over multiple symbols of the phase modulated input signal, where each soft metric is computed as $$\lambda_{j,2} \cong \frac{A}{\sigma^2} \left\{ \max_{x:x_{j,2}=+1} \left| \sum_{k,i} y_{k,i} p_{k,i} + \sum_{k=m}^{m+n} (r_{k-1,2} - r_{k,1}) x_{k-1,2} \right| - \max_{x:x_{j,2}=-1} \left| \sum_{k,i} y_{k,i} p_{k,i} + \sum_{k=m}^{m+n} (r_{k-1,2} - r_{k,1}) x_{k-1,2} \right| \right\}$$

where A represents an estimate of amplitude; $\sigma^2$ represents an estimate of received noise variance; $x_{j,i}$ represents value of the symbol at time index j,i; $x_{k,i}$ represents data at time index k,i; $p_{k,i}$ represents pilot/preamble samples when they are provided to the receiver; i is an index that represents the first half symbol (i=1) and second half symbol (i=2) observation at each time index k and j; $y_{k,i}$ represents received samples of the pilot/preamble after half-symbol integrations commencing halfway through the symbol interval when they are provided to the receiver; $r_{k,i}$ represents received samples of the data after half-symbol integrations commencing halfway through the symbol interval; and m and n are indexes such that the set of observations $r_{k,i}$ is assumed to start with k=m−1, i=2 and end with k=m+n, i=1; j ∈ {m, . . . , m+n}; and
- a combiner configured to receive the soft metrics from the plurality of multiple symbol noncoherent soft output detectors and to detect data based upon the soft metrics.

26. The combined RFID receiver system of claim 25, wherein the combiner is configured to detect data by combining the soft metrics.

27. The combined RFID receiver system of claim 25, wherein the combiner is configured to select at least one of the soft metrics from the plurality of multiple symbol noncoherent soft output detectors based upon a threshold level of reliability.

28. The combined RIFD receiver system of claim 25, wherein the soft metrics generated by the plurality of multiple symbol noncoherent soft output detectors are based on the Log Likelihood Ratio of the detected symbol based upon observations over multiple symbols.

29. The combined RFID receiver system of claim 28, wherein the phase modulated signal comprising symbols transmitted by an RFID tag is a phase modulated signal comprising symbols backscattered by an RFID tag.

30. The combined RFID receiver system of claim 25, wherein the FM0 modulated input signal comprises a known preamble sequence and an unknown data sequence.

31. The combined RFID receiver system of claim 30, wherein the observations include observations over at least one symbol in the preamble sequence and at least one symbol in the unknown data sequence.

32. The combined RFID receiver system of claim 31, wherein the observations include observations over the entire preamble and at least three symbols in the unknown data sequence.

33. The combined RFID receiver system of claim 32, wherein:
- the FM0 modulated input signal further comprises a known pilot sequence; and
- the observations include observations over the entire pilot and preamble and at least three symbols in the unknown data sequence.

* * * * *